United States Patent Office 3,006,246
Patented Oct. 31, 1961

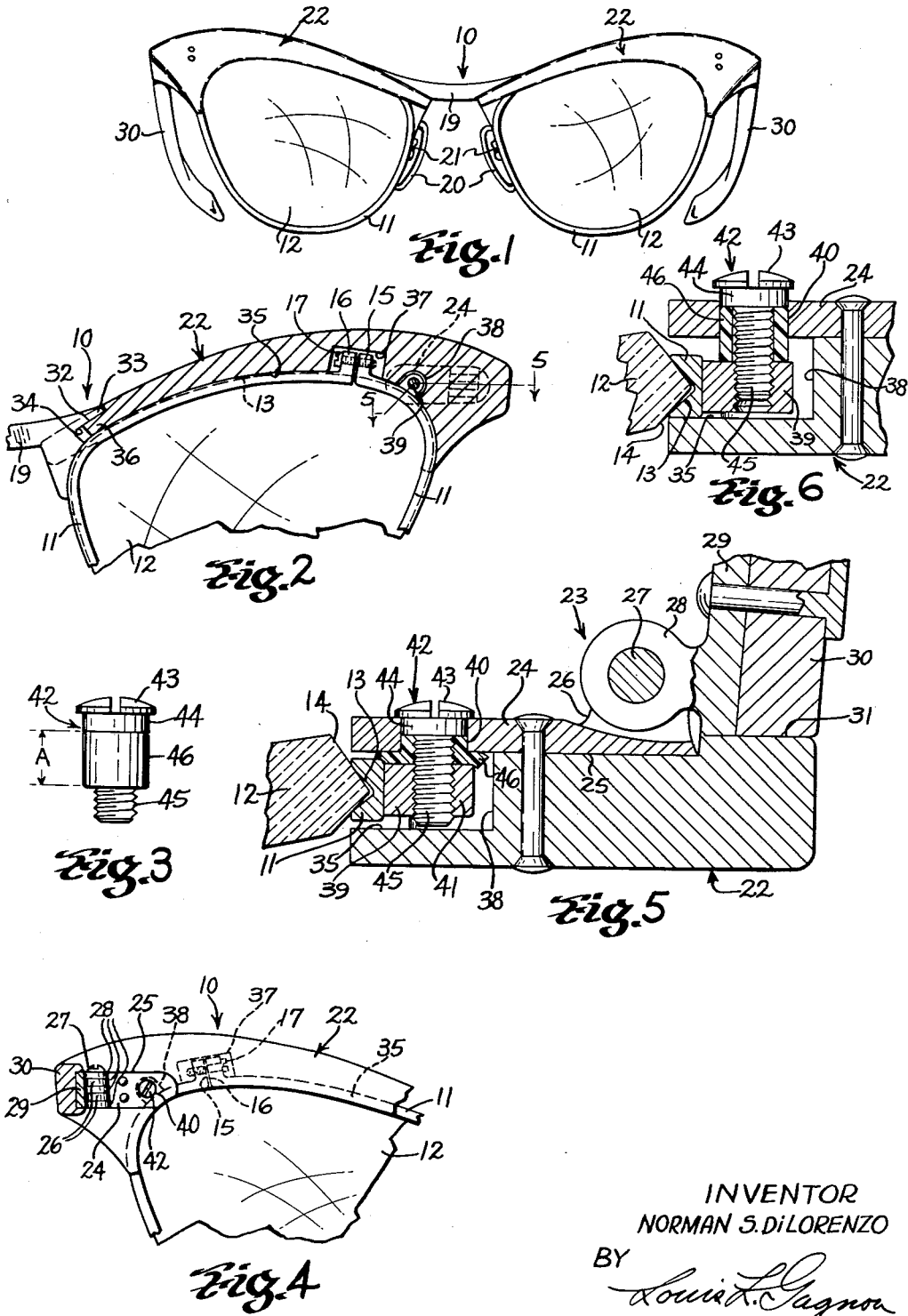

3,006,246
OPHTHALMIC MOUNTINGS
Norman S. Di Lorenzo, Southbridge, Mass., assignor to American Optical Company, Southbridge, Mass., a voluntary association of Massachusetts
Filed June 19, 1958, Ser. No. 743,097
3 Claims. (Cl. 88—41)

This invention relates to improvements in ophthalmic mountings and has particular reference to the provision of novel means for connecting the brow sections of spectacle fronts to the lens supporting parts thereof.

In ophthalmic mountings wherein the lenses are supported by eyewires which are, in turn, placed within grooved brow sections of the mountings, means for securing the eyewires to their respective brow sections, is generally provided in the form of a screw or the like which extends through one side of a respective brow section to threadedly engage a lug having a threaded opening therein provided on the eyewire. For given odd lens shapes the coquilling of the eyewires which support the lenses must be such as to allow the eyewires to intimately fit and follow about the edges of the lenses. Since different prescriptive curvatures or lens thicknesses cause the eyewires to follow paths of slightly different shapes about the lens edges, it is necessary to form the eyewire receiving grooves in the brow parts of spectacle frames somewhat wider than the width of the eyewires so as to cause said grooves to accept the various coquillings of the eyewires and thus render the brow sections receptive to all mounted lenses of a particular eye shape. It also follows that in order to permit the connecting lug part of the eyewire to fit within the brow part of the spectacle frame, an enlarged recess must be provided in the brow part for receiving the lug part of the eyewire.

In most instances, when the brow part of a mounting is placed over the eyewire of a mounted lens, the eyewire is initially loosely received in the groove of the brow part and it has been the practice heretofore to hold the eyewire in place by inserting a screw through the rear of the brow part and threading the screw into the lug on the eyewire.

When in continual use ophthalmic mountings are subjected to a great deal of twisting and bending or other torsional strains which causes conventional screw connections to become loosened and in the case of a screw connection of the above type, this loosening allows the lenses and their rims to wobble or become loosened within the grooves of the brow parts. If not tightened periodically the screws will work loose to a point where the brow section might become detached from the lens rim. Furthermore, loose connections cause an annoying rattling of lens rim against the sides of the groove in the brow part which is very disturbing to the wearer of the mounting and this rattling becomes extremely pronounced when both the eyewires and brow parts are formed of metal.

The present invention provides novel means for overcoming the disturbing effects of loose screw connections of the above character in ophthalmic mountings and it is accordingly a principal object of the present invention to provide improved, secure and simple means for connecting together parts of ophthalmic mountings.

Another object is to provide in a relatively intricate screw connection of the type used in ophthalmic mountings, novel cushioning means between the connected parts of said mounting which will simultaneously relatively permanently lock said screw connection in a desired position of use.

Another object is to provide an improved screw connection for connecting together parts of an ophthalmic mounting wherein means is provided for supporting a bushing of compressible plastic material under compression between the parts of the mounting to lock the parts together and by the inherent resiliency and yieldability of said material provide a cushioning between said parts to prevent their coming into direct contact with each other.

Another object is to provide an improved replacement screw for use in ophthalmic mountings of the above character wherein said screw embodies an enlarged head, a reduced shouldered part joining said head and a further reduced threaded shank having a bushing of nylon material in close fitting surrounding relation with a portion of said shank adjacent said shouldered part and said bushing being of an outer diameter substantially equal to that of said shouldered part.

Another object is to provide a screw of the above character for connecting parts of ophthalmic mountings wherein a predetermined section of the bushing on said screw will, when in use, flange outwardly of the shank part thereof to flow between the parts of a mounting being connected and be held under compression between said parts of the mounting to provide locking means for retaining said screw in a desired position of use and to cushion said parts from each other.

Another object is to provide improved connecting means in the form of a screw having a bushing of nylon material thereon for connecting a lug part of an eyewire of an ophthalmic mounting to the brow part of said mounting wherein said screw, when extended through a side of said brow part and threaded into said lug part of the eyewire, will compress said bushing to flange the same between said lug part and brow part and through the inherent tendency of the material of said bushing to return to its initial shape, set up a compression force to lock said screw in a desired position of use and form a resilient washerlike cushion, functioning to space said lug part from said side of the brow part.

Another object is to provide an improved screw and nylon bushing arrangement for use in ophthalmic mountings which is inexpensive to manufacture and will provide a simple solution to the problem of avoiding loose connection more particularly between the eyewire and brow parts of ophthalmic mountings.

Other objects and advantages of the invention will become apparent from the following description when taken in conjunction with the accompanying drawings in which:

FIG. 1 is a front elevational view of an ophthalmic mounting embodying the invention;

FIG. 2 is an enlarged fragmentary front view of the left eye portion of the mounting of FIG. 1 with the brow part thereof shown in vertical cross-section to reveal its connection with a lens supporting eyewire of the mounting.

FIG. 3 is a side elevational view of the screw connecting means of the invention;

FIG. 4 is a fragmentary rear view of the part of the mounting which is illustrated by FIG. 2;

FIG. 5 is a greatly enlarged transverse cross-sectional view taken substantially on line 5—5 of FIG. 2 and illustrating the screw connecting means of the invention on its final position of use in the ophthalmic mounting; and FIG. 6 is a greatly enlarged cross-sectional view similar to FIG. 5 but illustrating an earlier step in the assembling of the parts of the mounting with the screw connecting means of the invention.

Referring more particularly to the drawings wherein like characters of reference designate like parts throughout the various views, there is shown in FIG. 1, 2 and 4 an ophthalmic mounting 10 embodying a pair of conventional split lens rims or eyewires 11 in each of which is fitted a lens 12. The eyewires 11 are contoured to fit snugly about the outer edges of their respective lenses and are each provided with an inner beveled groove 13 (see FIGS. 5 and 6) fitted over the beveled edges 14 of the lenses 12. At the separation of each of the eyewires, which permits the customary insertion or removal of the lenses 12, there is provided a pair of lugs 15 and 16 (FIGS. 2 and 4) which are connected by a screw 17 for drawing the eyewires into tight binding relation about the lenses 12. A bridge 19 is provided to connect the eyewires 11 together at their nasal sides and the usual nose engaging pads 20 on arms 21 are fixed to the eyewires 11 just below the bridge 19.

Removably fitted in overlying relation with the upper portion of each of the eyewires 11 is the brow part 22 of the mounting having at its temporal end a hinge connection 23 embodying a hinge plate 24 which is fitted into a mating recess 25 on the rear surface of the part 22 and riveted or otherwise secured firmly in place as best illustrated in FIG. 5. Rearwardly extending hinge ears 26 are provided on the plate 24 which interfit with and are pivotally connected by a pintle 27 to hinge ears 28 forming a part of a second hinge plate 29 riveted or otherwise attached to a temple 30 extending rearwardly of the mounting 10. In this manner, the temples 30 may be placed in a position of use as shown in FIGS. 1 and 5 with their forward ends 31 abutting the rear surface of their respective brow parts 22 or, alternatively, swung about their pintles 27 to a closed position against the rear of the mounting 10.

Each of the brow parts 22 are provided with a bifurcation at their nasal ends to pass to either side of the bridge 19. In addition, a groove 32 (FIG. 2) extends back from the bifurcation along the top of each of the brow parts 22 just far enough to accommodate the upper corners 33 of the bridge 19 above the location where the bridge 19 is slotted at 34 so as to be spaced from the eyewire. The under side of each of the brow parts 22 is channeled at 35 throughout its length to a depth sufficient to receive and conceal the portion of the eyewires 11 fitted therein. Thus, a web 36 is left between the groove 32 and channel 35 of the brow parts 22 which latches into the slot 34, or space between the bridge 19, and eyewire 11 and forms a detachable connection for the brow parts 22 with the nasal portion of the eyewire and bridge assembly.

Extending upwardly into each of the brow parts 22 from their respective channels 35, there is provided a recess 37 (FIG. 2) so located as to house the lugs 15 and 16 of the eyewire connection. Further toward the temporal ends of each of the brow parts 22, there is provided a second recess 38 somewhat similar to recess 37 in which is housed a lug 39 soldered or otherwise secured to the eyewire 11. It is this lug 39 that provides means for locking the brow part 22 to the eyewire 11 in a manner to be presently described in greater detail.

It is pointed out that by proper control of the length of the recess 37 so as to cause the screw 17 and lugs 15 and 16 to fit relatively close to its ends, a loosening of the screw 17 which might take place during the use of the mounting will cause its head to strike the adjacent end of the recess 37 and prevent further loosening of the screw 17 thus overcoming the danger of the split in the eyewires 11 from widening to a point where the lenses 12 might be released from their respective eyewires.

Referring more particularly to FIGS. 2 and 6 wherein one eye portion of the mounting 10 is illustrated in great detail, it can be seen that with the nasal end of the brow part 22 latched in place as shown and the eyewire 11 interengaged with the channel 35, the lug 39 will be located in the recess 38 so as to be forwardly of the hinge plate 24. To provide a positive connection between the brow part 22 and the eyewire 11 with the use of the lug 39, an opening 40 is provided through the hinge plate 24 to communicate with the recess 38 and it has been the usual practice to pass a conventional screw through this opening and thread the same into a threaded opening 41 in the lug 39. As discussed hereinabove, such screws have a tendency to work loose and because of the fact that the channel 35 and recesses 37 and 38 must be of a width somewhat greater than the width of the eyewire 11 and lugs 15, 16 and 39, for the reasons given above, a rattling of the eyewire 11 in the brow part 22 takes place which becomes exceedingly annoying particularly when the eyewire and brow part are both constructed of metal. Furthermore, when conventional screws work loose to a point where they become disengaged with the lug 39, as they might well do, the eyewire and bridge assembly drops away from the brow parts 22.

In accordance with the present invention novel means in the form of an improved screw 42 (FIG. 3) is provided to make the above mentioned connection between the eyewire 11 and the brow part 22 of the mounting 10.

The screw 42 is provided with a head 43 which, as illustrated, is slotted to receive a screw driver but may be constructed with a hex-shaped portion or the like to accept other types of tools. Beneath the head 43 a reduced shoulder 44 is formed to an outer diameter such as to fit relatively snugly in the opening 40 of the mounting's hinge plate 24 and an elongated threaded shank 45 depends from the shoulder 44. A tubular bushing 46 preferably formed of nylon or other similarly characterized material having an outer diameter substantially equal to that of the shoulder 44 is snugly fitted on the shank 45 with one of its ends engaging the shoulder 44. The bushing 46 extends from the shoulder 44 over a substantial portion of the shank 45 and is of a length controlled in accordance with the particular mounting in which it is to be used. When the screw 42 is used in the mounting 10 which is shown for purposes of illustration, the length A of the bushing 46 is controlled to be such as to extend from a point near the outer surface of the hinge plate 24 through the opening 40 therein to the adjacent side of the lug 39 when the eyewire 11 is forced against the forward side of the recess 38 as illustrated in FIG. 6.

In making the connection between the eyewire, lug 39, and the hinge plate 24 the screw 42 is inserted in the opening 40 and by placing a screw driver in the slotted head 43 the exposed end of the shank 45 is threaded into the lug 39 until the bushing 46 makes end contact with the lug 39. In so doing the force directed along the longitudinal axis of the screw 42 by the use of the screw driver will cause the eyewire 11 to strike the forward side of the recess 38 in the manner shown in FIG. 6 whereupon, with the bushing 46 in end contact with the lug 39, the shoulder 41 will just enter the opening 40 so as to confine the adjacent upper portion of the bushing within the opening 40.

The lower end of the bushing 46 being unsupported (see FIG. 6) will, upon further threading of the screw 42 into lug 39, begin to flow or flange out laterally due to the compressing force which is applied to the bushing. It is to be noted, however, that due to the intimate fit of the shoulder 44 in the opening 40, no upward flow of the material of the bushing will take place.

Continued threading of the screw 42 into the lug 39 will cause the head 43, of the screw 42 to ultimately strike the outer surface of the hinge plate 24 and the unsupported part of the bushing to flow or flange out between the lug and inner surface of the hinge plate 24. By further continuing the threading of the screw 42, with its head 43 in engagement with the plate 24, the lug 39 is drawn away from the forward side of the recess 38 and toward the hinge plate 24 as shown in FIG. 5 to set up a compressing force on the flanged part of the bushing 46 which is now confined between the lug 39 and the shoulder 44 of the screw 42. By initially properly controlling the length of the bushing 46, the lug 39 and eyewire 11 will be located substantially centrally in the recess 38 (FIG. 5) at the time the screw strongly resists further threading into the lug 39. That is, without using undue or excessive force on the screw driver, the sides of the eyewire 11 will be substantially equally spaced from their respective sides of the recess 38 and be permanently held in such a position.

Due to the inherent desirable characteristics of the nylon material of the bushing such as its stability, resiliency and yieldability, the flanged part of the bushing 46 will provide a permanent cushion between the eyewire and hinge plate 24 which prevents the eyewire 11 and/or its lug parts 15, 16 and 39 from rattling in their respective channels 35 or recesses 37 and 38. Furthermore, bp compressing the bushing 46 as described, the inherent tendency for the material of the bushing to return to its initial shape causes a frictional forrce to be set up between the bushing and the screw to relatively permanently lock the screw in the above described assembled relation with the mounting 10.

With the screw 42 in its final position of use as shown in FIG. 5, a permanent rattle free and non-loosening secure connection is provided for connecting the brow parts 22 of the mounting with the eyewire and bridge assembly.

It should be understood that while only one type of ophthalmic mounting has been shown for the purpose of illustrating the invention a screw connection of the character just described is readily adaptable for use in other types of ophthalmic mountings.

From the foregoing, it will be seen that simple, highly efficient and economical means and methods have been provided for accomplishing all the objects and advantages of the invention. Nevertheless, it is apparent that many changes in the details of construction and arrangement of parts may be made without departing from the spirit of the invention as expressed in the accompanying claims and the invention is not limited to the exact matters shown and described as only the preferred matters have been given by way of illustration.

Having described my invention, I claim:

1. In a lens supporting structure for an ophthalmic mounting, the combination of a pair of spaced metallic eyewires, an outwardly disposed metallic lug on each of said eyewires having a threaded opening therein, a bridge connecting said eyewires together, detachable metallic brow parts each having a longitudinally channeled portion fitted over a respective one of the upper sections of said eyewires, said detachable parts each having a recess opening into said channeled portion for receiving the lug of a respective one of said eyewires and being of a width considerably greater than the thickness of said lug, one of the side walls of each of said recesses having an opening therethrough and means for connecting each of said detachable brow parts to a respective one of said eyewires, said connecting means comprising a screw having an enlarged head overlying its respective opening in said detachable brow parts, a reduced shouldered portion adjoining said head closely fitted in and being of a controlled length such as to extend only partially through the opening in a respective one of said detachable brow parts, a further reduced threaded shank extending from said shouldered portion and threaded into the lug of a respective eyewire, and an initially cylindrically shaped bushing of compressible plastic material in surrounding relation with said shank between said lug and shouldered portion, the material of said bushing filling the remaining portion of said opening, said bushing being of a controlled initial length such as to be outwardly flanged adjacent said lug in response to the tightening of the screw to form a resilient cushion between said metallic lug and said side wall of the metallic detachable brow part having the opening therethrough.

2. In an ophthalmic mounting embodying a pair of spaced metallic eyewires each having a lens fitted therein and an outwardly disposed metallic lug having a threaded opening therein, a bridge connecting said eyewires together, detachable metallic brow parts fitted over a section of each of said eyewires, said detachable parts each having a recess therein for receiving a respective one of the lugs of said eyewires and being of a width considerably greater than the thickness of said lugs, a metallic hinge plate forming one side wall of each of said recesses, said hinge plates each having an opening therethrough communicating with the respective recesses, a temple pivotally connected to each of said hinge plates and means for connecting each of said detachable brow parts to a respective eyewire, said connecting means comprising a screw having an enlarged head overlying said opening, a reduced shouldered portion adjoining said head and closely fitted in and being of a controlled length such as to extend only within a portion of said opening adjacent said head, a further reduced threaded shank extending from said shouldered portion and threaded into said lug, and an initially cylindrically shaped bushing of compressible plastic material in surrounding relation with said shank between said lug and shouldered portion, the material of said bushing filling the remaining portion of said opening, said bushing being of a controlled initial length such as to be outwardly flanged adjacent said lug in response to the tightening of the screw to form a resilient cushion between said metallic lug and the adjacent surface of the metallic hinge plate.

3. A screw connection for use in assembling metallic parts of an ophthalmic mounting embodying a pair of spaced metallic eyewires each having an outwardly disposed metallic lug thereon, said lug having a threaded opening therein, a bridge connecting said eyewires together, metallic brow parts each having a channeled portion fitted over the upper section of each of said eyewires and a recess in each of said metallic brow parts communicating with said channeled portion for receiving the lug of a respective eyewire and being of a width considerably greater than the thickness of said lug, one of the side walls of each of said recesses having an opening therethrough, said screw connection comprising a screw having an enlarged head of a size to overlie one end of said opening in said brow part when assembled therewith, a reduced shouldered portion adjoining said head adapted to closely fit into and being of a length so controlled as to extend only partially through said opening, a further reduced threaded shank extending from said shouldered portion and adapted to be threaded into said lug an initially cylindrically shaped bushing of nylon material intimately fitted on said threaded shank and being of an outer diameter substantially equal to that of said opening, said bushing being adapted to be placed under compression in surrounding relation with said shank between said lug and shouldered portion and being of a controlled length such that the material of said bushing in response to the tightening of the screw when connecting said metallic parts, will be compressed and will fill the space between the walls of said opening and said threaded shank and will be flanged outwardly adjacent said lug to form a resilient cushion between said lug and said brow part.

References Cited in the file of this patent

UNITED STATES PATENTS

| | | |
|---|---|---|
| 1,158,454 | De Camp | Nov. 2, 1915 |
| 2,181,365 | Cozzens | Nov. 28, 1939 |
| 2,332,160 | McDonell | Oct. 19, 1943 |
| 2,678,585 | Ellis | May 18, 1954 |
| 2,696,756 | Salierno | Dec. 14, 1954 |
| 2,748,655 | Rohrbach | June 5, 1956 |
| 2,852,056 | Rapata | Sept. 16, 1958 |